Patented Nov. 17, 1953

2,659,712

UNITED STATES PATENT OFFICE 2,659,712

PREPARATION OF RESINOUS CONDENSATION PRODUCTS FROM AROMATIC KETONES AND AMINES

Ralph B. Thompson, Hinsdale, and Herman S. Bloch, Chicago, Ill., assignors to Universal Oil Products Company, Chicago, Ill., a corporation of Delaware No Drawing. Application August 9, 1950, Serial No. 178,556

11 Claims. (Cl. 260—65)

This application is a continuation-in-part of our copending application Serial No. 706,066, filed October 26, 1946, now abandoned.

The invention relates to a process for the manufacture of resinous materials useful in the production of coating compositions, and to a new class of such products comprising the condensation reaction products of a particular class of amino compounds, hereinafter more explicitly characterized, with certain defined types of aromatic ketones, variable in their physical properties depending upon the conditions under which the condensation reaction is effected and the structural type of organic amine employed as one of the reactants in the condensation reaction. More particularly, the invention relates to a new class of resinous products characterized as the condensation reaction products formed by reacting an aromatic polyketone containing at least two acyl groups on the aryl nucleus with an aromatic, aliphatic, naphthenic or heterocyclic polyamine. It is one object of the present invention to prepare resinous condensation products by means of a simple reaction mechanism involving the chemical condensation of organic reactants containing multiple keto and amino groups as hereinafter described.

Another object of the invention is to prepare resinous materials having either thermosetting or thermoplastic properties, depending upon the species of polyamino compound employed as a reactive component in the preparation thereof, and upon the conditions selected for effecting the reaction of the charging stocks.

Still another object of the invention is to produce resinous materials in the absence of any recognized catalytic agent, thereby eliminating the necessity of removing a catalyst from the resinous condensation product following the reaction in which said product is formed.

Broadly, this invention comprises reacting a nuclearly polyacyl-substituted aromatic compound with a polyamino compound containing at least two radicals per molecule selected from the primary and secondary amino groups at reaction conditions and in such proportions that condensation between the acyl keto groups and said amino groups, resulting in the formation of a resinous product and water, is substantially the sole reaction.

Another embodiment of the invention concerns a resinous material containing a multiplicity of organo radicals selected from the group consisting of:

(1)

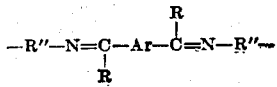

and (2)

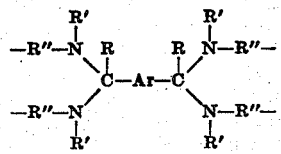

wherein Ar is an aryl hydrocarbon nucleus, R is an aliphatic hydrocarbon radical containing from 1 to about 5 carbon atoms per group, R' is a radical selected from the group consisting of hydrogen, alkyl, alkenyl, aryl, aralkyl and cycloalkyl, and R" is a divalent radical selected from the group consisting of alkylene, arylene, aralkylene, and cycloalkylene.

In one of its specific embodiments the present invention concerns a resinous product formed by the process which comprises condensing an aromatic polyketone containing at least two acyl substituents on the aryl nucleus with a polyamino compound at a temperature of from about 50° to about 300° C., and in such proportion of molecular equivalents of said polyamino and polyacyl compounds that condensation between the amino hydrogen and acyl oxygen is substantially the sole reaction involved in the formation of said resinous product.

Another specific embodiment of the invention relates to a process for the preparation of a thermoplastic resinous product which comprises reacting a diacetyl benzene hydrocarbon containing both acetyl groups on the aryl nucleus with an equimolecular proportion of a diamino alkane at a temperature of from about 50° to about 300° C. until approximately two molecular proportions of water have been eliminated from the reaction mixture.

Other embodiments relating to specific reactants and to particular means of effecting the condensation reaction and isolation of the resinous product will be hereinafter described in greater detail.

The reaction mechanism, believed to be the primary reaction involved in the formation of the present resinous products is the well known condensation reaction occurring under certain conditions between an organic compound containing a ketonic oxygen atom and another compound containing a primary or secondary amino group, whereby water is eliminated and a ketimino linkage is formed. The discovery upon which the present invention is based is that new and distinctive resinous products having physical properties which range from very viscous liquids to hard, brittle solids, may be prepared by the condensation of a polyamino organic compound with a polyacyl aromatic compound in which at least two of said acyl groups are nuclear substituents. The resinous condensation product of a diacylaromatic compound and a di-primary amino compound is, according to the above mechanism, a linear, chain-like molecule of a thermoplastic type resin comprising a number of condensate units joined in a continuous chain-like fashion forming a polymer of said condensate unit which melts at relatively low temperature and which is relatively soluble in organic solvents, such as liquid hydrocarbons, alcohols, ethers, etc. In the case of a triamino reactant or a polyamine containing more than two functional amino groups per molecule, a so-called "cross-linking" effect is obtained with a diketone and the desinous product is a high molecular weight, thermosetting type of resin wherein some of the linkages are believed to be in non-linear relationship to each other and extend between chains of adjacent condensate monomer units of the resin molecule. Similarly, a diamine and a triketone or any polyketone having more than two ketonic groups are capable of forming a cross-linked, thermosetting condensation product. In the former case, the structural formula of a typical thermoplastic type of resin obtained by means of the present reaction between a di-primary amine and a diketone may be represented by the following empirical formula:

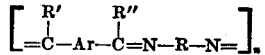

where R represents a divalent alkylene, alkenylene, cycloalkylene or arylene group, R' and R" are alkyl, arylalkyl, or cycloalkyl, and Ar represents an aromatic nucleus (either a mono- or polynuclear aryl group), and $n$ represents a number greater than one, corresponding to the number of the above individual monomer condensate units comprising the resin molecule. In the thermosetting type of resin wherein a cross-linking arrangement is believed to be present within the resin molecule formed from a diketone and a polyamine, a typical structural formula for a representative portion of the resin molecule is the following:

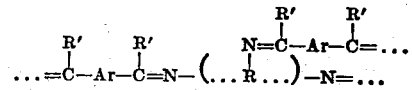

and for the condensation product of a polyketone with a poly-secondary amine, the following empirical formula represents the molecular structure of the resin molecule:

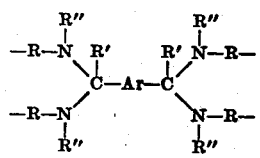

where R represents at least a trivalent organic residue of a polyamine, such as an aromatic nucleus or an alkyl, alkenyl or cycloalkyl radical, Ar represents at least a divalent aryl group such as those derived from benzene, toluene, anthracene, naphthalene, etc., and R' and R" are alkyl, aryl, aralkyl, and cycloalkyl groups. In the reaction with a secondary amine, it will be noted that the ketone group is bifunctional, whereas in reaction with a primary amine it is monofunctional. The cross-linking effect obtained in the case of the reaction between a polyamine containing at least three amino groups and a poly- ketone results in a resin of high molecular weight and of highly branched chain structure, causing the formation of a tough resinous product which is generally insoluble in organic solvents.

The reactant herein referred to as polyacyl aromatic compound containing at least two nuclear acyl groups, which when reacted with a polyamine forms the present resinous condensation product, is defined structurally as a compound containing an aromatic nucleus which is either mono-nuclear (that is, benzenoid) in structure or polynuclear, the latter being represented by the radicals of such aryl compounds as naphthalene, diphenyl, anthracene, phenanthrene, etc. The indicated class of polyacyl aromatic compounds may be represented by such compounds as o-, m-, or p-diacetylbenzene, o-, m-, or p-, o'-, m'-, or p'- diacetyldiphenyl, o-, m-, or p-dipropionylbenzene, and similar compounds having the structure

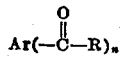

wherein Ar is a mono- or polycyclic aryl group, R is an aliphatic hydrocarbon radical containing from 1 to about 5 carbon atoms per R group or an aryl group, $n$ is a whole number from 2 to 3 for the benzenoid aryl series or from 2 to 5 for the polynuclear aryl compounds. Other radicals such as alkyl, alkenyl, aryl, amino, halo, hydroxy, alkoxy or acyloxy groups may be present on the aryl nucleus to modify the properties of the ultimate resinous products, although they do not enter into the condensation reaction. Typical of representative compounds containing besides at least two acyl groups per molecule another or other nuclear substituents are such compounds as 2,4-diacetyltoluene, 2,4-diacetylphenol, 2,4-diacetyl-3,5-dichlorobenzene, 2,4-diacetylanisole, diacetylmethylnaphthalene, etc.

The polyacyl aromatic reactant may be obtained from any convenient source, but one of the preferred and most economical methods of preparing the aromatic polyketones contemplated in the present process is by oxidizing the corresponding alkyl or alkenyl aromatic compound. Diacetyl benzene, for example, may be synthesized by the oxidation of diethylbenzene or of diisopropylbenzene, usually in the presence of a catalytic agent such as manganese stearate. Other methods of preparation, especially for specific members, as for example by reacting an aromatic hydrocarbon with the acyl halide corresponding to the desired acyl substituent, are also well known in the art.

The polyamine reactant which, when condensed with the aromatic polyketone hereinabove specified, at condensation reaction conditions, forms the resinous product of this invention, may be selected from the group of amines comprising the aliphatic saturated or unsaturated polyamines, either of straight or branched chain configuration, and the cyclic amines, containing secondary and/or primary amino groups. Typical polyaminoalkanes utilizable herein include such di-primary amino-substituted alkane compounds as 1,3 - diaminobutane, the triamino - substituted compounds such as 1,3,4-triaminohexane, diethylenetriamine, and other amines such as putrescine, cadaverine, 1,6-hexamethylene diamine, etc. The aromatic polyamines include compounds such o-, m-, or p-phenylenediamine, benzidine, and others, wherein the amino group is nuclearly substituted, and p-aminophenylethylamine, wherein one of the amino groups is nuclearly substituted and the other amino group substituted on a side chain attached to the aromatic nucleus. Of the secondary amines, compounds such as diethylenediamine (piperazine), and the N,N'-dialkylphenylenediamines are representative examples. The diamino compound may contain secondary as well as primary amino groups within the same molecule, such as N-methyl-p-phenylenediamine, N-alkylphenylenediamine and diethylenetriamine.

The polyamine may contain other chemical substituents in addition to the amino groups, which, in general, determine the physical and chemical properties of the resin, and in some instances the presence of such groups determines the solubility of the resinous product in various solvents. Thus the polyamino compounds may contain hydroxy, alkyl, alkenyl, alkadienyl, alkoxy, acyloxy, or halogen substituents on the hydrocarbon residue of the reactant molecule. These substituents must be so selected, however, that under the ketone-amine condensation reaction conditions herein specified, said substituents do not react with the polyketones or substituents thereof, such that by the condensation of the amino and ketone carbonyl groups of the reactants, water and resinous ketimino compounds are formed as substantially the sole reaction products. The presence of unsaturated hydrocarbon radicals such as alkenyl and alkadienyl groups in the molecule of the polyamine reactant enables the condensation product to undergo further subsequent polymerization to form resins of increasing molecular weight and, in general, markedly alters the physical properties of the resin; the polymerization may be thermal or catalytic.

The polyamines utilizable in the present condensation type of reaction to yield resinous products necessarily exclude tertiary amines which contain no n-hydrogen atoms condensable with the keto oxygen groups in the structure of the aromatic polyketone. The polyamine reactant is thus selected from the group consisting of the primary and secondary polyamines.

The condensation reaction involved in the formation of the present resinous product may be effected at least to partial completion merely by heating a mixture of the resinifying reactants to the reaction temperature, although a catalyst is generally preferred in the system to promote the rate of reaction and reduce the reaction temperature required. The question of whether a catalyst is desirable or not in a particular system of reactants will depend upon the ease with which the reactants tend to condense to form the resinous product. The catalysts, when utilized, are selected from a group of chemicals well known for their activity in causing condensation reactions and for the present reaction, from the relatively mild reagents for this purpose such as the relatively mild Friedel-Crafts metal halides and acid-acting catalysts such as the mineral acids and certain organic acids. A dilute mineral acid, such as dilute phosphoric, hydrochloric or sulfuric acid in sufficient quantity and/or concentration to result in a slightly acidic reaction mixture is generally preferred as catalyst. Of the Friedel-Crafts halide catalysts, the members of this group which are relatively mild in activity are preferred, these including the chlorides and bromides of boron, zinc, iron, tin, bismuth, zirconium, and others. The catalyst may be subsequently removed from the resinous product by contacting the product with a solvent which has a selective miscibility with the condensation catalyst, such as water, or alternatively, the resin may be dissolved from the catalyst in a solvent which selectively dissolves the resin, such as benzene. In general, the condensation reaction proceeds towards completion at a more rapid rate, and the product isolated from the reaction mixture possesses more of the desired resinous properties when a catalyst is employed in the condensation reaction; however, when the reaction proceeds readily at a relatively low reaction temperature in the absence of a catalyst, a non-catalyzed reaction is preferred, since the latter eliminates the necessity of subsequently separating the catalytic agent from the reaction mixtures to obtain a neutral or purely organic resinous product. In some instances, the reactants may be mixed at or below room temperature and heated to the desired reaction temperature to cause the condensation reaction to proceed to substantial completion, forming the resin product in its ultimately desired form. In other instances, the components may be mixed and heated to a reactive temperature until a partially condensed resinoid product is obtained, and the material thus produced subsequently heated in a molding or other shaping apparatus to complete the condensation reaction.

When reacting the more readily condensible polyketones and polyamines, such as compounds in these classes containing unsaturated side chains, the reaction may be initiated at relatively low temperatures, as for example, from about 50° to about 150° C., while in the case of the less reactive starting materials, the mixture of reactants is desirably heated to a temperature of from about 100° to about 300° C. to effect condensation at a desired rate. It is not necessary in most instances to employ superatmospheric pressures during the condensation reaction, except when utilizing a reactant having a low boiling point and a superatmospheric pressure is required to maintain the reactant in liquid phase during the condensation. The proportion of reactants required to produce a desirable resin will vary according to the type and number of amino groups and keto groups in each of the respective reactants. In the case of a polyamino reactant in which the amino groups are entirely primary (i. e. di-hydrogen substituted nitrogen atoms), an equivalent proportion of keto groups will theoretically react with a given number of amino groups introduced into the reaction mixture via the polyamino reactant. In the case of a polyamino reactant containing secondary amino groups, the corresponding theoretical ratio of reactants is two equivalent proportions of the polyamino compound to each functional unit of aromatic polyketone. Although the ratios of the reactants indicated above will theoretically combine to form the present resinous product, it is generally preferable to maintain a slight excess of the aromatic polyketone in the reaction, tending to produce a product of higher melting-point, and in some instances, a thermo-setting product, where, in the absence of such an excess, a thermoplastic product might otherwise be the product at the completion of the reaction. For example, the condensation of p,p'-diacetyldiphenyl with ethylenediamine may be made to yield a thermosetting resin by the use of a slight excess of the diketone. The excess of the latter reactant may be recovered from the final product, or allowed to remain therein, as desired.

The product formed in a catalyzed condensation reaction may be isolated by reaction of a base with the catalyst and separating the resulting phases after neutralization of the acidic catalyst. Suitable bases include water or an aqueous alkali solution, which dissolves the acid catalyst or the corresponding salt of the same from the desired resin product.

The present condensation reaction may be carried out in the presence of a solvent miscible with one or more of the reacting components and/or the resultant resinous product. The solvent may be selected from such low molecular weight hydrocarbons as pentane, hexane, benzene, toluene, petroleum ether, etc.; the short chain alcohols, such as ethyl alcohol; or an ether, such as di-isopropyl ether, dibutyl ether, etc. A solvent having a boiling point above the reaction temperature required for the condensation reaction is generally preferred, although in some instances a more volatile solvent may be employed at superatmospheric pressures sufficient to maintain substantially liquid phase or a refluxing solvent may be utilized as a means of maintaining the temperature of the reaction at a constant value. A solvent such as ethyl alcohol may also be specifically added to the reaction mixture to form an azeotrope with the water formed as a product of the condensation reaction, thus providing a means of removing the latter from the reaction product, either during the condensation reaction or following the formation of the product. The solvent, after completion of the reaction, may thereafter be removed from the product by extraction or by heating the resinous product (at reduced pressure, if desired) to vaporize the solvent therefrom. In many cases, it is desirable to employ the solvent as a diluent of the reactants, so as to control the rate of reaction or the temperature developed during the condensation reaction. The product in such cases usually has a more desirable color, and its other physical properties, such as texture and hardness, are improved.

After completion of the initial condensation reaction and the separation of the resinous product from the reaction mixture, the latter may be dried and pulverized into a finely divided form suitable for subsequent molding operations, mixing into protective coating compositions, or utilized directly in the manufacture of other compositions, such as plastics. When an excess of either reactant is employed in the condensation reaction, or if the initial reaction is not allowed to proceed to completion, represented by complete condensation of all available keto groups and primary and secondary amino groups in the structure of the polyamino and polyacyl aromatic reactants, the reaction product separated from the initial condensation may be further reacted with an additional quantity of either of the reactants to form thereby a resin having properties different from the initial condensation reaction product. The final stage of the reaction or completion of the condensation of the reactants may be conducted in a heated mold or other shaping apparatus, when desired. A convenient method of molding the present resinous product is to conduct the initial condensation reaction merely to partial completion, thus forming a soft, resinous product which usually possesses thermoplastic properties, and subsequently completing the reaction by heating the initial condensation product in the desired mold, forming either a thermosetting resin or a thermoplastic product having a higher melting point.

Resinous condensation products obtained in the present reaction have widespread utility in the various arts, depending in large measure on the physical properties of the product. Certain of the resins, for example, may be dissolved in a suitable drying oil, such as an unsaturated fatty acid glyceride or an unsaturated hydrocarbon conjunct polymer to form varnish, paint, printing ink or other coating compositions, and when employed for such purposes, the resin contributes valuable film-forming and bodying properties to the composition. The protective coatings prepared from the present resins form a glossy surface, resistant to many chemicals, water, and abrasive agents, and the paint or varnish in which such resins are incorporated dries quickly to a hard, tough and non-tacky film. In some cases, the present products are useful as plasticizers, particularly when the product is a semi-solid or viscous liquid resin. When solid thermoplastic resinous products are formed in the condensation reaction, these may be melted and/or extruded into variously shaped articles or used to impregnate cellulosic materials, such as paper or shaped wooden articles, or the resin may be heated with wood flour, wood chips, cotton linters, asbestos or other fibrous material, to form semi-rigid or rigid structural shapes.

The following examples are presented for purposes of illustrating specific embodiments of the present invention, but are not intended to limit the scope of the invention in strict accordance with the particular variables specified therein.

*Example I*

A thermoplastic resinous product was formed by reacting 15 g. (0.063 mol) of p,p'-diacetyldiphenyl with 5.7 g. (0.0648 mol) of 1,3-diaminobutane, dissolved in benzene, at the boiling point of the latter solvent, under refluxing conditions. The water formed as a by-product of the reaction separated as an azeotrope with the benzene, and was carried out of the reactor as overhead vapor from the reflux condenser. After boiling until 1.1 g. of water had been evolved, the product remained soluble in the warm benbene. The benzene was evaporated from the condensation product and 18.5 g. of resin was recovered as residue therefrom. When this material was heated to 180°–185° C. further condensation occurred, with the simultaneous liberation of water and the formation of a clear, amber resin having a softening point of 180.5° F. by the "ring and ball" method of determining softening points.

The product obtained in the second stage of the above reaction was also formed by mixing the same ratio of reactants and heating the mixture to 180° C.

*Example II*

A thermosetting resin (the product being infusible up to about 300° C.) was obtained by the reaction of 15 g. (0.063 mol) of p,p'-diacetyldiphenyl with 6.8 g. (0.066 mol) of diethylenetriamine in the presence of benzene as a solvent. The solution of reactants was refluxed and the vapors of benzene-water azeotrope condensed outside of the reaction flask. After liberation of 1.4 g. of water as the azeotrope, the condensation product was isolated by evaporating the benzene therefrom. Upon heating the product to 180° C. a tough, resinous mass, which does not soften, was obtained.

The same resin as obtained above was prepared by heating the reactants directly at 200° C. in the absence of a solvent.

Example III

A high-melting, thermosetting resin was obtained by heating a mixture of 3 g. 0.0128 mol) of p,p'-diacetyldiphenyl and 0.8 g. (0.0133 mol) of ethylene diamine to 210° C., resulting in the formation of an insoluble brown powder which does not melt at temperatures below about 300° C.

Example IV

A clear, orange, thermoplastic resin was prepared by reaction of equimolecular proportions of p-diacetylbenzene and 1,3-diaminobutane. The reaction may be conducted at a rapid rate at temperatures in the range of from about 235–245° C. or the reaction may be made to proceed more slowly at temperatures in the region of 200–205° C. The reactants condense only partially to yield viscous liquids or sticky solids at temperatures below the above range, but when subsequently subjected to higher temperatures, a solid resinous mass is formed.

Example V

A dark brown thermosetting resin is obtained by the condensation of p-diacetylbenzene and diethylenetriamine at reaction conditions within the range specified above in Example IV.

We claim as our invention:

1. A process for the manufacture of a resinous product which comprises reacting a nuclearly polyacyl-substituted aromatic compound with a polyamino compound containing at least two radicals per molecule selected from the group consisting of the primary and secondary amino groups and being free of other substituents which are reactable with said aromatic compound in the process, said aromatic compound being of the general formula $Ar(COR)_n$ wherein R is selected from the group consisting of an aryl radical and an aliphatic hydrocarbon radical of from 1 to 5 carbon atoms, $n$ is a whole number of from 2 to 5 and Ar is an aromatic group having the acyl groups substituted on an aromatic ring thereof and which is free of amino-reactive substituents other than the acyl groups, said aromatic and amino compounds being reacted at a temperature of from about 50° to about 300° C. and in approximately equivalent proportions as defined by the equivalence of one carbonyl group to two amino hydrogen atoms.

2. A process for the manufacture of a resinous product which comprises reacting a nuclearly polyacyl-substituted aromatic compound with a polyamino compound containing at least two radicals per molecule selected from the group consisting of the primary and secondary amino groups and being free of other substituents which are reactable with said aromatic compound in the process, said aromatic compound being of the beneral formula $Ar(COR)_n$ wherein R is an aliphatic hydrocarbon radical of from 1 to 5 carbon atoms, $n$ is a whole number of from 2 to 5 and Ar is an aromatic group having the acyl groups substituted on an aromatic ring thereof and which is free of amino-reactive substituents other than the acyl groups, said aromatic and amino compounds being reacted at a temperature of from about 50° to about 300° C. and in approximately equivalent proportions as defined by the equivalence of one carbonyl group to two amino hydrogen atoms.

3. A process for the manufacture of a resinous product which comprises reacting a nuclearly polyacyl-substituted benzene compound with a polyamino compound containing at least two radicals per molecule selected from the group consisting of the primary and secondary amino groups and being free of other substituents which are reactable with said benzene compound in the process, said benzene compound being of the general formula $Ar(COR)_n$ wherein R is an aliphatic hydrocarbon radical of from 1 to 5 carbon atoms, $n$ is a whole number of from 2 to 3 and Ar is a benzene group which is free of amino-reactive substituents other than the acyl groups, said aromatic and amino compounds being reacted at a temperature of from about 50° to about 300° C. and in approximately equivalent proportions as defined by the equivalence of one carbonyl group to two amino hydrogen atoms.

4. A resinous product produced in accordance with the process of claim 1.

5. The process of claim 1 further characterized in that said nuclearly polyacyl-substituted aromatic compound is a diacylbenzene and said polyamino compound is a di-primary amino-substituted alkane.

6. A resinous product produced in accordance with the process of claim 5.

7. The process of claim 1 further characterized in that said nuclearly polyacyl-substituted aromatic compound is a diacylbenzene and said polyamino compound is a triamino-substituted alkane.

8. A resinous product produced in accordance with the process of claim 7.

9. The process of claim 1 further characterized in that said aromatic and amino compounds are reacted in the presence of a catalyst selected from the group consisting of a mineral acid and a relatively mild Friedel-Crafts halide catalyst.

10. The resinous condensation product of p-diacetyl-benzene with 1,3-diaminobutane, said compounds having been reacted at a temperature of from about 50° to about 300° C. and in approximately equivalent proportions as defined by the equivalence of one carbonyl group to two amino hydrogen atoms.

11. The resinous condensation product of p,p'-diacetyl-diphenyl with diethylene-triamine, said compounds having been reacted at a temperature of from about 50° to about 300° C. and in approximately equivalent proportions as defined by the equivalence of one carbonyl group to two amino hydrogen atoms.

RALPH B. THOMPSON.
HERMAN S. BLOCH.

References Cited in the file of this patent
UNITED STATES PATENTS

| Number | Name | Date |
|---|---|---|
| 2,122,707 | Balthis | July 5, 1938 |
| 2,352,387 | Hopff et al. | June 27, 1944 |
| 2,462,668 | Pederson et al. | Feb. 22, 1949 |

OTHER REFERENCES

Webster's New International Dictionary 2nd Ed., Merriam-Webster, 1939, pg. 158.